United States Patent

Boelart et al.

[11] Patent Number: 5,537,047
[45] Date of Patent: Jul. 16, 1996

[54] VIDEO NOISE ANALYZER

[75] Inventors: Eduardo I. Boelart, Buena Park, Calif.; Manuel Grace, Scottsdale, Ariz.

[73] Assignee: Philips Electronics North America Corporation, New York, N.Y.

[21] Appl. No.: 134,235

[22] Filed: Oct. 12, 1993

[51] Int. Cl.$^6$ .................................................. G01R 29/26
[52] U.S. Cl. ............................................ 324/613; 378/98.2
[58] Field of Search ................................... 324/612, 613, 324/121 R; 345/118, 119, 120; 378/98, 98.2, 98.7

[56] References Cited

U.S. PATENT DOCUMENTS

| | | | |
|---|---|---|---|
| 2,595,646 | 5/1952 | Doba et al. | 324/613 |
| 4,710,761 | 12/1987 | Kapur et al. | 345/120 X |
| 4,894,851 | 1/1990 | Kroon et al. | 378/98.2 |
| 5,067,142 | 11/1991 | Gall et al. | 378/98.2 |
| 5,144,430 | 9/1992 | Boelart | 358/139 |
| 5,202,671 | 4/1993 | Aranda et al. | 345/119 X |

*Primary Examiner*—Kenneth A. Wieder
*Assistant Examiner*—Glenn W. Brown
*Attorney, Agent, or Firm*—Jack D. Slobod

[57] ABSTRACT

A noise analyzer apparatus for a video signal produced by an X-ray imaging system corresponding to an image generates, in response to vertical and horizontal sync pulses, a two-level gating signal which is at a predetermined level solely during the times that intensity information contained in the video signal corresponds to pixels in an adjustably positionable window area of the image. A gated noise measuring circuit responsive to intensity information contained in the video signal and to the gating signal forms a signal which is a measure of a noise content solely within the window area of the image. A signal combiner combines the video signal and a signal derived from the gating signal to produce an augmented video signal containing in its intensity information a marker indicating the location of the window area. The augmented video signal is fed to a display from which the operator may observe the repositioning of the window area in the image as vertical and horizontal time delays introduced in the noise analyzer are adjusted.

12 Claims, 1 Drawing Sheet

VIDEO NOISE ANALYZER

BACKGROUND OF THE INVENTION

1. Field of the Invention

The present invention relates generally to noise analyzers for video produced by imaging systems and, in particular, to analyzers suitable for quantifying the noise present in video produced by an X-ray imaging system.

2. Description of the Related Art

X-ray imaging systems of the type suitable for examination of patients employ relatively low X-ray dose levels to irradiate the patient in order to limit the patient's exposure. As a consequence of employing such low dose levels, the X-ray images that are produced, on film or otherwise, may exhibit noticeable X-ray quantum noise.

X-ray imaging systems of a type utilizing an X-ray image intensifier and camera chain to detect the X-ray image and to produce a video image are being employed in a growing number of examinations. In addition to the availability of X-ray images as a real time display on a monitor, for example in fluoroscopy applications, electronic image processing and/or archiving in a mass storage device may be implemented in radiologic applications. The images produced by such systems may exhibit electrical noise introduced by the image intensifier and camera chain in addition to the X-ray quantum noise.

While it is possible to judge qualitatively from observation whether an image has excessive noise, no equipment is known for providing a quantitative measure of the noise present in a video image. Further, apparent noisiness may vary spatially within an X-ray image, and inhomogeneity in a test phantom may be misinterpreted or mismeasured as noise.

In commonly-owned U.S. Pat. No. 5,144,430, a device and method are disclosed for generating an operator positionable marker signal in a video image to serve as an oscilloscope trigger.

SUMMARY OF THE INVENTION

The present invention recognizes the need for providing a quantitative measure of noise in a video image. Such a measure would be useful in the setup and maintenance (particularly when replacing a part) of an X-ray imaging system by enabling adjustment of dose or dose rate and the other parameters of the system to achieve an optimum balance between the competing goals of low dose and limited noise in the image. The quantitative measure of noise performance of such a system, once adjusted, may be used to compare one system to another and to compare the performance of a given system at different times. The present invention also recognizes that because of the possibility of inhomogeneity in the test phantom introducing erroneous results in the measurement, noise should be measured solely from video corresponding to an operator selected localized area of the image.

Accordingly, it is an object of the present invention to provide a noise analyzer for video produced by an imaging system which provides a quantitative measure of the noise within an operator positionable window area defining localized positions in the image.

It is a further object of the present invention that such analyzer be sensitive to both quantum noise and electrical noise.

Briefly, these and other objects of the present invention are satisfied by providing a noise analyzer which generates a two-level gating signal which is at a predetermined level only during the times that the horizontal and vertical scanning signals that would be generated from the horizontal and vertical sync pulses correspond to a location within an operator positionable window area. This gating signal controls an electronic switch which causes video to be applied to a peak averaging circuit only while the gating signal is at the predetermined level. The averaging time constant of the peak averaging circuit and a time constant associated with AC coupling of the video signal are chosen to achieve a frequency range for the analyzer providing sensitivity to both X-ray quantum noise and electrical noise. In order that the operator can observe the position of the window area in the image, the gating signal is combined with the video signal to form an augmented video signal for feeding to a display.

Other objects, features and advantages of the present invention will become apparent upon perusal of the following detailed description, wherein:

DETAILED DESCRIPTION OF THE PREFERRED EMBODIMENT

Figure 1:
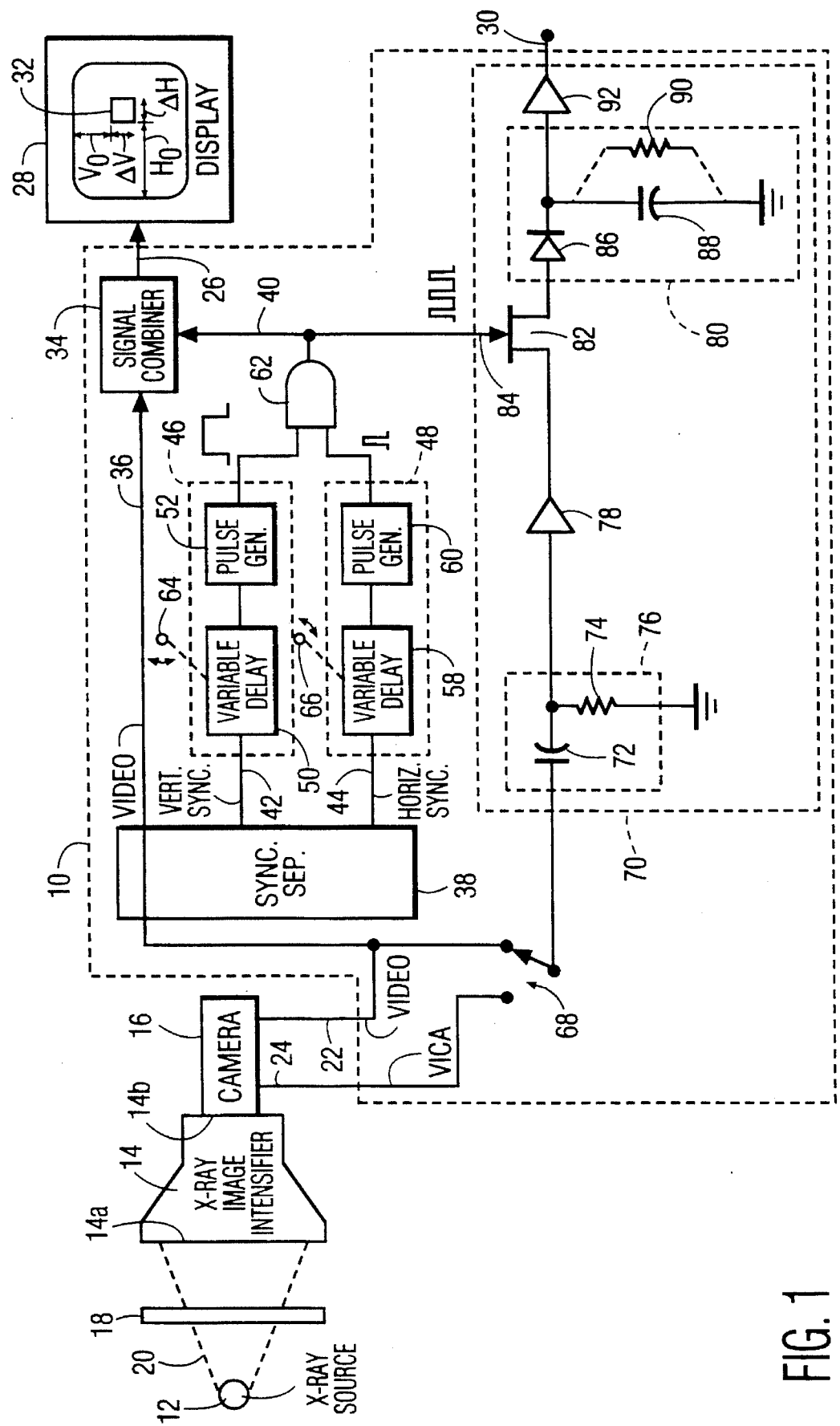
FIG. 1, the sole figure of the drawing, is a schematic diagram of the noise analyzer of the present invention in conjunction with an X-ray imaging system.

The noise analyzer 10 of the present invention is generally shown in FIG. 1 in conjunction with an X-ray imaging system, including an X-ray source 12, X-ray image intensifier 14 and video camera 16, set up for examination of a test phantom 18. The latter is preferably a copper plate of 1.5 mm uniform thickness. A beam 20 of X-ray radiation from the X-ray source 12 is attenuated by test phantom 18 and forms an X-ray projection image on the front screen 14a of X-ray image intensifier 14. This X-ray image is converted by image intensifier 14 to an optical image on the output screen 14b. The camera 16 converts the optical image to a video image, inherent in the video signal which it supplies on its output line 22. This video signal includes the usual horizontal and vertical sync pulses and has a dynamic range which is set by automatic gain control (AGC) within the camera. In addition, a further video signal known as VICA (an acronym for Video In Camera) is available on line 24. The latter signal does not include sync pulses and is not affected by AGC.

The video supplied on line 22 may be the same format as in conventional television broadcasts in the United States, i.e. 60 fields per second which are 2:1 interlaced so that two successive fields, each containing 262.5 lines, in combination produce a 525 line frame. Other scan formats are common, including those which are non-interlaced, have a greater number of lines per frame, and/or have a greater number of frames per second. Such other formats, in general, have a faster horizontal line rate than conventional television in order to produce the requisite number of lines within a frame. Further, the X-ray source 12 may be operated in a pulse mode, triggered by vertical sync pulses supplied by camera 16 or in a "continuous" mode where a plurality of successive video frames are read out from camera 16 during a time interval that the X-ray source 12 is on.

The noise analyzer 10 produces an augmented video output signal on output line 26 which feeds a display device or monitor 28 and produces an output signal on its output line 30 which is a measure of the noise in the video image solely within a window area 32 shown as a marker on display 28 encompassing a portion of the area of the image displayed.

The augmented video signal on line 26 is formed by a signal combiner that receives on its input line 36, the video signal output from a sync separator 38, and on its input line 40, a gating signal. The video signal on input line 36 is representative of the X-ray image formed by the camera of phantom 18, producing a grey background on display 28 and the gating signal on line 40 drives or clamps the video signal to a white level throughout window area 32. Sync separator 38 is fed by the video signal from line 22 of the camera 16 and produces the video signal on output line 36 in essentially the same form as its input, as well as outputting extracted vertical and horizonal sync pulses on lines 42 and 44, respectively.

The vertical sync pulses on line 42 and the horizontal sync pulses on line 44 feed respective delayed pulse generators 46, 48. Delayed pulse generator 46 is formed by a variable delay element 50 followed by a pulse generator 52 which initiates a pulse of predetermined duration upon the expiration of the delay introduced by the delay element. Since the vertical sync pulse triggers each vertical scan in a downward direction beginning at the top of the image, the delay introduced by delay element 50 represents the distance $V_0$ from the top of the display to the top of window area 32. Further, the duration of the pulse produced by pulse generator 52 represents the vertical extent $\Delta V$ of window area 32. Similarly, the delayed pulse generator 48 is formed by the variable delay element 58 followed by pulse generator 60, the delay introduced by delay element 58 corresponding to the distance $H_0$ from the left side of the image to the left side of window area 32 and the predetermined duration of the pulse generated by pulse generator 60 corresponding to the horizontal extent $\Delta H$ of window area 32. The outputs of pulse generators 52, 60 feed an AND type circuit 62 which produces a two-level or binary output signal which is at a high level only during times when the pulses produced by pulse generators 52, 60 cause both inputs to AND type circuit 62 to be at a high level. It should be apparent that the gating signal on line 40 produced by AND type circuit 62 is at a high level only when raster scanning signals derivable in response to the vertical and horizontal sync pulses contained in the video signal on line 22 indicate an instantaneous position within both the vertical and horizontal extents $\Delta V$, $\Delta H$ of window area 32.

The delays introduced by variable delay elements 50, 58 are adjusted by respective control elements 64, 66 which an operator may adjust while observing the resultant repositioning of the window area on the display 28. Preferably, the window area is placed over a relatively homogeneous area of the image to avoid erroneous noise measurement results due to inhomogeneity in the test phantom 18.

The predetermined duration of the pulse produced by pulse generator is preferably selected to be about 1 to 2% of the entire vertical extent of the image display, e.g. six lines per frame or three lines per field in a conventional interlaced television format, and a similar percentage of the entire horizontal extent of the image. These pulse durations and the range of adjustment of variable delays elements 50, 58 are selected based upon the scan format.

The video and VICA signals on lines 22, 24 are also fed to a selector switch 68 which passes a selected one to the input of a gated noise measuring circuit 70. Noise measuring circuit 70 has at its input an AC coupling capacitor which forms, in conjunction with an actual or effective input resistance 74 connected to ground, a high pass filter 76 preferably passing frequencies greater than a few hundred Hz. The output of high pass filter 76 is buffered by an amplifier 78 whose output feeds a peak detector via a transistor or FET switch 80. The control electrode 84 of transistor switch 82 receives the gating signal 40 from AND type device 62. As a result, transistor switch 80 is rendered conductive solely during the time that the gating signal is at a high level, corresponding to instantaneous position within the window area 32, and during said time passes the high-passed video signal from buffer 78 to peak detector 80.

Peak detector 80 comprises a diode 86 and capacitor 88 connected between the diode and ground. An inherent leakage resistance 90 of capacitor 88 in conjunction with the value of capacitor 88 should yield a high frequency cutoff of at least 15 MHz to provide adequate bandwidth for detecting noise. The output of peak detector 80 feeds a buffer 92 whose output supplies the quantitative noise measure signal 30 which may be read by an external meter or oscilloscope (not shown).

The VICA signal on line 24 rather than the video signal on line 22 may be fed via selector switch 68 to the input of gated noise measuring circuit. This setup avoids the effect of AGC within camera 16.

In the use of the noise analyzer of the present invention, preferably a sequence of noise measurements are taken at different X-ray dose levels, to ascertain an appropriate balance between the competing objectives of limiting dose and limiting noise.

Further, the apparatus described in U.S. Pat. No. 5,144,430 is preferably combined or integrated with the apparatus of the present invention in order to enable observation of a selected line of video on an oscilloscope.

It should now be appreciated that the objects of the present invention are fully satisfied by the apparatus described herein in particular detail. Numerous modifications in such detail are possible within the intended spirit and scope of the invention.

What is claimed is:

1. A noise analyzer apparatus for a video signal produced by an imaging system corresponding to an image, said apparatus comprising:

gating signal generating means responsive to scan control information derived from said video signal for generating a two-level gating signal which is at a predetermined level solely during the times that intensity information contained in said video signal corresponds to positions in a window area of said image which is located and sized to encompass a portion of said image;

adjusting means for enabling adjustment of the location of said window area in said image; and measure signal forming means responsive to intensity information contained in said video signal and to said gating signal for forming a signal which is a measure of a noise content solely within the window area of the image.

2. The apparatus as claimed in claim 1, wherein said measure signal forming means comprises an averaging peak detection means and switch means having a control electrode fed by said gating signal and a pair of main electrodes connected in a manner that said video signal is applied to said averaging peak detector means solely during the time the gating signal is at said predetermined level.

3. The apparatus as claimed in claim 2, wherein said scan control information comprises vertical sync pulses and horizontal sync pulses, and said gating signal generating means comprises:

first time delayed pulse generator means responsive to each vertical sync pulse for generating a first pulse, corresponding to a vertical extent of said window area, a first time delay after said vertical sync pulse;

second time delayed pulse generator means responsive to each horizontal sync pulse for generating a second pulse, corresponding to a horizontal extent of said window area, a second time delay after said horizontal sync pulse; and AND means, responsive to said first and second pulses for forming said gating signal.

4. The apparatus as claimed in claim 3, wherein said adjusting means comprises means for adjusting said first and second time delays.

5. The apparatus as claimed in claim 1, wherein said scan control information comprises vertical sync pulses and horizontal sync pulses, and said gating signal generating means comprises:

first time delayed pulse generator means responsive to each vertical sync pulse for generating a first pulse, corresponding to a vertical extent of said window area, a first time delay after said vertical sync pulse;

second time delayed pulse generator means responsive to each horizontal sync pulse for generating a second pulse, corresponding to a horizontal extent of said window area, a second time delay after said horizontal sync pulse; and AND means, responsive to said first and second pulses for forming said gating signal.

6. The apparatus as claimed in claim 5, wherein said adjusting means comprises means for adjusting said first and second time delays.

7. A noise analyzer apparatus for a video signal produced by an imaging system corresponding to an image, said apparatus comprising;

gating signal generating means responsive to scan control information derived from said video signal for generating a two-level gating signal which is at a predetermined level solely during the times that intensity information contained in said video signal corresponds to positions in a window area of said image which is located and sized to encompass a portion of said image;

adjusting means for enabling adjustment of the location of said window area in said image;

measure signal forming means responsive to intensity information contained in said video signal and to said gating signal for forming a signal which is a measure of a noise content solely within the window area of the image, and signal combining means for combining said video signal and a signal derived from said gating signal to produce an augmented video signal for feeding a display, said augmented video signal containing in its intensity information a marker indicating the location of the window area.

8. The apparatus as claimed in claim 7, wherein said measure signal forming means comprises an averaging peak detection means and switch means having a control electrode fed by said gating signal and a pair of main electrodes connected in a manner that said video signal is applied to said averaging peak detector means solely during the time the gating signal is at said predetermined level.

9. The apparatus as claimed in claim 8, wherein said scan control information comprises vertical sync pulses and horizontal sync pulses, and said gating signal generating means comprises:

first time delayed pulse generator means responsive to each vertical sync pulse for generating a first pulse, corresponding to a vertical extent of said window area, a first time delay after said vertical sync pulse;

second time delayed pulse generator means responsive to each horizontal sync pulse for generating a second pulse, corresponding to a horizontal extent of said window area, a second time delay after said horizontal sync pulse; and AND means, responsive to said first and second pulses for forming said gating signal.

10. The apparatus as claimed in claim 9, wherein said adjusting means comprises means for adjusting said first and second time delays.

11. The apparatus as claimed in claim 7, wherein said scan control information comprises vertical sync pulses and horizontal sync pulses, and said gating signal generating means comprises:

first time delayed pulse generator means responsive to each vertical sync pulse for generating a first pulse, corresponding to a vertical extent of said window area, a first time delay after said vertical sync pulse;

second time delayed pulse generator means responsive to each horizontal sync pulse for generating a second pulse, corresponding to a horizontal extent of said window area, a second time delay after said horizontal sync pulse; and AND means, responsive to said first and second pulses for forming said gating signal.

12. The apparatus as claimed in claim 11, wherein said adjusting means comprises means for adjusting said first and second time delays.

* * * * *